US012790969B2

(12) United States Patent
Koci et al.

(10) Patent No.: US 12,790,969 B2
(45) Date of Patent: Nov. 10, 2026

(54) AIR SYSTEM AND METHOD FOR ENGINE UTILIZING ELECTRIC-ASSIST COMPRESSOR FOR PURGING GASES

(71) Applicant: Caterpillar Inc., Peoria, IL (US)

(72) Inventors: Chad Palmer Koci, Washington, IL (US); Bobby John, Peoria, IL (US); Radoslav Boychov Ivanov, Dupnitsa (BG); Matthew T. Wolk, Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 19/007,713

(22) Filed: Jan. 2, 2025

(65) Prior Publication Data

US 2026/0185470 A1 Jul. 2, 2026

(51) Int. Cl.
*F01M 13/02* (2006.01)
*F02B 39/10* (2006.01)
*F02B 43/10* (2006.01)

(52) U.S. Cl.
CPC .......... *F01M 13/028* (2013.01); *F02B 39/10* (2013.01); *F02B 43/10* (2013.01)

(58) Field of Classification Search
CPC ........ F02B 39/10; F02B 43/10; F01M 13/028
See application file for complete search history.

(56) References Cited

U.S. PATENT DOCUMENTS 11,939,895 B2 3/2024 Fev
12,492,652 B2 * 12/2025 Ishikawa .............. F01M 13/028
2018/0223751 A1 * 8/2018 Xiao ........................ F02D 41/08
2020/0291833 A1 * 9/2020 Schatz ................... F01M 13/04
2023/0313750 A1 10/2023 Li

FOREIGN PATENT DOCUMENTS

CN 115750035 A 3/2023
CN 118008529 A 5/2024
CN 220890288 U 5/2024
JP 4650356 B2 3/2011
JP 2024021720 A 2/2024
WO 2023138814 A1 7/2023
WO 2024046775 A1 3/2024

* cited by examiner

*Primary Examiner* — Kevin A Lathers

(57) ABSTRACT

Operating an engine system includes operating an electric-assist compressor in an air system for an engine while the engine is running, and operating the electric-assist compressor while the engine is not running. Pressurized air from operating the electric-assist compressor while the engine is not running is fed in a first flow pattern through the air system to purge a plurality of cylinders of the engine, and fed in a second flow pattern through the air system to a crankcase of the engine to purge the crankcase. Related apparatus in an engine system and an energized air system is also disclosed.

20 Claims, 2 Drawing Sheets

AIR SYSTEM AND METHOD FOR ENGINE UTILIZING ELECTRIC-ASSIST COMPRESSOR FOR PURGING GASES

FEDERALLY SPONSORED RESEARCH OR DEVELOPMENT

This invention was made with government support under DE-EE0010606 awarded by Department of Energy. The government has certain rights in the invention.

TECHNICAL FIELD

The present disclosure relates generally to operating an internal combustion engine system, and more particularly to operating an electric-assist compressor in such an engine system to purge cylinders and a crankcase of an engine.

BACKGROUND

Internal combustion engine systems are well-known and widely used throughout the world for a range of purposes including propulsion of land vehicles and marine vessels, and operation of pumps, compressors, and electrical generators to name a few examples. Traditional liquid fuel strategies employing gasoline, diesel, and other hydrocarbon fuels have long been recognized to emit various undesired emissions. Gaseous fuel engines operating on, for example, natural gas can be associated with reduced emissions of certain types, notably particulates, but remain suboptimal for certain applications. In recent years increased attention has been given to the use of so-called alternative fuels, with the ultimate aim to operate engines with substantially zero undesired emissions without sacrificing desirable properties such as power output, power density, and various others.

Various engine systems are also known that incorporate electrically powered components in combination with components operated via combustion fuels. Such "hybrid" systems offer much promise, but in many instances have yet to reach their full theoretical potential.

In regard to certain alternative fuel engines, including engines burning hydrogen, it has been recognized that factors such as extremely rapid flame speed and ignitability can create new challenges respecting engine control and operation as well as management and containment of the fuel itself. One known hydrogen engine is set forth in Chinese Patent No. 118008529. The '529 patent proposes to operate an auxiliary compressor driven by a starter motor or the like when the engine shuts down, to produce a stream of pressurized air through a dedicated feed conduit that can be used to force residual gasses out of an engine. While the '529 patent may have certain applications, there is always room for improvement and development of alternative strategies.

SUMMARY

In one aspect, a method of operating an engine system includes operating an electric-assist compressor in an air system for an engine while the engine is running, and feeding pressurized air from the electric-assist compressor operated while the engine is running in a first flow pattern through the engine system to a plurality of cylinders in the engine for combustion with a fuel therein. The method further includes operating the electric-assist compressor while the engine is not running, and feeding pressurized air from the electric-assist compressor operated while the engine is not running in the first flow pattern through the air system so as to purge the plurality of cylinders. The method still further includes feeding pressurized air from the electric-assist compressor operated while the engine is not running in a second flow pattern through the air system to a crankcase of the engine so as to purge the crankcase.

In another aspect, an internal combustion engine system includes an engine having an engine housing with a plurality of cylinders formed therein, a plurality of pistons positioned in the plurality of cylinders, and a crankcase coupled to the engine housing. The engine system further includes an air system having an intake conduit extending between an air inlet and an intake manifold coupled to the engine housing, a ventilation conduit extending between the intake conduit and the crankcase, and a crankcase ventilation valve positioned at least partially in the ventilation conduit. The internal combustion engine system further includes an electric-assist compressor positioned fluidly between the air inlet and the intake manifold.

In still another aspect, an energized air system for an engine includes an intake conduit having an air inlet and configured to extend to an intake manifold coupled to an engine. The air system further includes a compressed air recirculation conduit arranged to recirculate compressed air between an upstream location of the intake conduit and a downstream location of the intake conduit. The air system also includes an electric-assist compressor arranged fluidly between the upstream location of the intake conduit and the downstream location of the intake conduit and arranged to feed pressurized air to the intake manifold. The air system still further includes a second compressor arranged to feed compressed air to the electric-assist compressor, a crankcase ventilation conduit, and a crankcase ventilation valve positioned at least partially in the crankcase ventilation conduit and adjustable between a closed position and on open position.

DETAILED DESCRIPTION

Figure 1:
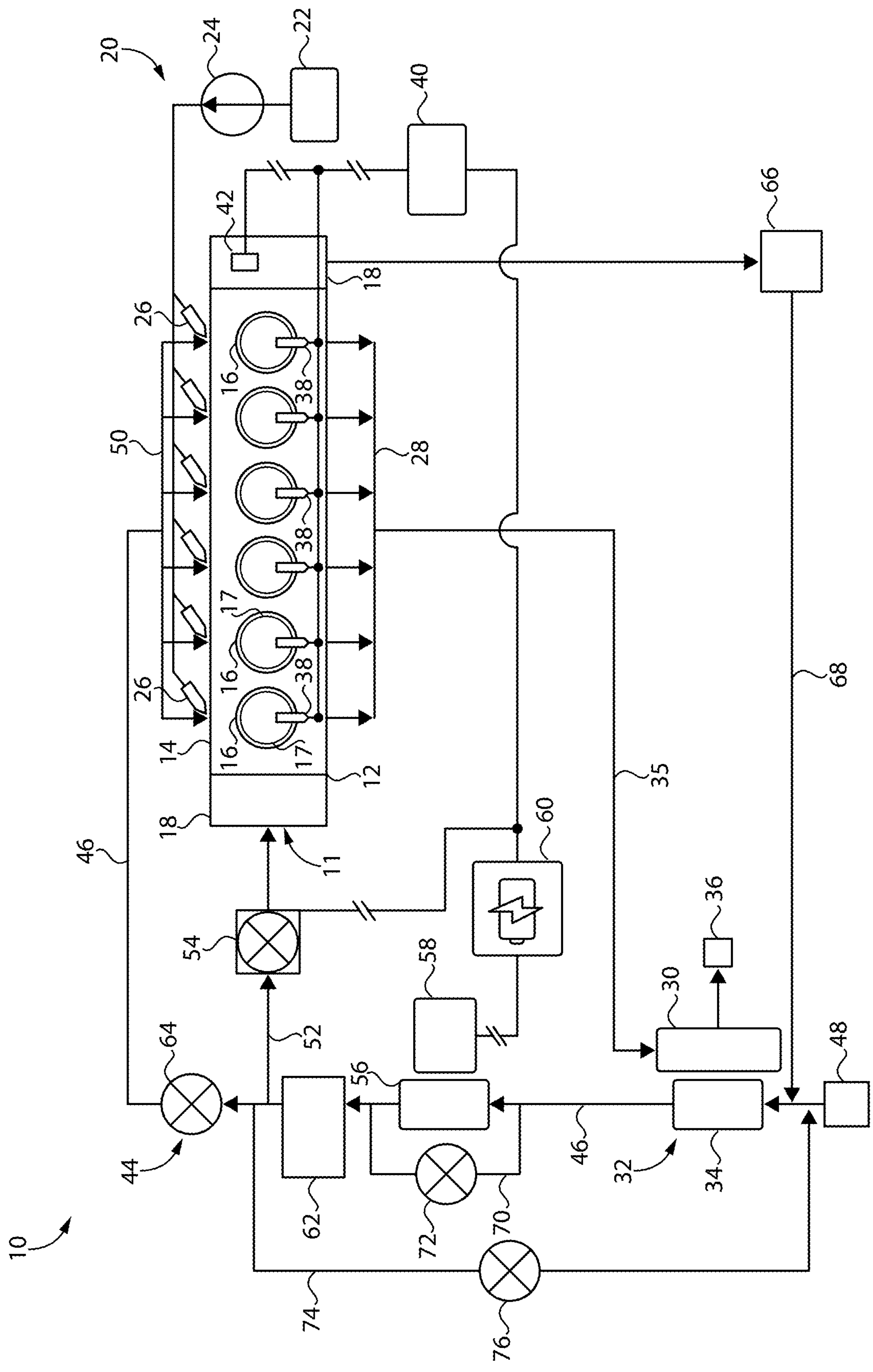
FIG. 1 is a diagrammatic view of an internal combustion engine system, according to one embodiment.

Referring to FIG. 1, there is shown an internal combustion engine system 10, according to one embodiment. Engine system 10 includes an engine 11 having an engine housing 12. Engine housing 12 includes a cylinder block 14 with a plurality of cylinders 16 formed therein. A plurality of pistons 17 are positioned in cylinders 16. Pistons 17 will be understood to be movable in a generally conventionally manner each between a top-dead-center position and a bottom-dead-center position. Cylinders 16 can include any number, in any suitable arrangement such as an in-line pattern as shown, a V-pattern, or still another. A cylinder head (not shown) will be understood to be attached to cylinder block 14, and supports one or more intake valves and one or more exhaust valves for each cylinder for controlling intake and exhaust of cylinders 16, typically in a four-stroke engine cycle. Engine housing 12 further includes a crankcase 18.

Engine system 10 also includes a fuel system 20. Fuel system 20 includes a fuel supply 22, and at least one fuel pump 24 operated to convey a feed of a fuel stored in fuel supply 22 to a plurality of fuel injectors 26. In one practical implementation fuel supply 22 contains a gaseous hydrogen fuel. A gaseous hydrogen fuel according to the present disclosure may include gaseous molecular hydrogen, or a variety of blends containing gaseous molecular hydrogen and a hydrocarbon gaseous fuel such as natural gas, ethane, methane, propane, or still others. Engine system 10 may also be configured to operate on more than one fuel type or a blended fuel at a range of blend ratios. Thus, engine system 10 might be operated, at times, on natural gas, and at other times on gaseous molecular hydrogen, and at still other times utilizing a blend of natural gas and gaseous molecular hydrogen. Fuel supply 22 may contain one or more stored fuels, or be connected to one or more gaseous fuel supply lines. Dual liquid and gaseous fuel strategies are also within the scope of the present disclosure, as well as potentially certain liquid fuel strategies.

In the illustrated embodiment, fuel injectors 26 are configured as port injectors each arranged to inject fuel for combustion in a corresponding one of cylinders 16 at a location of an intake port of engine housing 12. In other embodiments, fuel injectors 26 could be direct injectors each extending partially into a respective one of cylinders 16. Still other arrangements could include both port injectors and direct injectors, a manifold injector, or potentially a fumigation strategy where gaseous fuel is admitted via a controllable fuel admission valve upstream of engine 11 and mixed with a feed of intake air. An exhaust manifold 28 receives a feed of exhaust from cylinders 16 and conveys the exhaust by way of an exhaust conduit 35 to a turbine 30 in a turbocharger 32. Turbocharger 32 also includes a compressor 34 mechanically driven by way of a rotation of turbine 30. After extracting energy from the exhaust via turbine 30 the exhaust may be conveyed to an exhaust outlet 36 such as a tailpipe or an exhaust stack.

Also in the illustrated embodiment, engine system 10 includes a plurality of sparkplugs 38 each forming a spark gap within a corresponding one of cylinders 16. Sparkplugs 38 can be energized in a generally conventional manner to produce an electrical spark triggering ignition of a fuel and air mixture in the respective cylinder 16 at a suitable ignition timing. Compression-ignition, prechamber ignition, and still other ignition strategies are within the scope of the present disclosure. Sparkplugs 38 may be electrically connected to an electronic control unit 40. Electronic control unit or ECU 40 includes any suitable computerized control unit, and may be in electronic control communication with various other components in engine system 10 including, for example, a hydrogen sensor 42 producing data indicative of a hydrogen presence or concentration in crankcase 18, the purposes of which will be further apparent from the following description. Rather than monitoring hydrogen directly, ECU 40 might utilize maps or models to estimate or infer the presence and/or concentration of hydrogen in crankcase 18. In other instances, sensor 42 might include a moisture sensor, for example, sensing a presence or concentration of water vapor in crankcase 18. Both hydrogen and moisture in crankcase 18 could be monitored and acted upon in various embodiments.

Engine system 10 also includes an energized air system 44. An "energized" air system as contemplated herein means an air system for conveying and/or pressurizing air, or air mixed with other gases, that is operable independently of the presence of available engine and/or exhaust energy, as is the case with a traditional turbocharger. Air system 44 includes an intake conduit 46 extending between a fresh air inlet 48 and an intake manifold 50 coupled to engine housing 12. Air system 44 also includes a ventilation conduit 52 extending between intake conduit 46 and crankcase 18. Air system 44 may further include a crankcase ventilation valve 54 positioned at least partially in ventilation conduit 52 and adjustable between a closed position and an open position. Crankcase ventilation valve 54 may be electrically actuated, such as solenoid actuated, and in communication with and controlled by ECU 40.

Air system 44 further includes an electric-assist compressor 56 positioned fluidly between air inlet 48 and intake manifold 50. Electric-assist compressor 56 may be coupled to an electric motor 58 that rotates electric-assist compressor 56 to pressurize air. In the illustrated embodiment, electric-assist compressor 56 is a stand-alone component. In other instances, electric-assist compressor 56 might be a compressor in an electrically assisted turbocharger, for example. Engine system 10 also includes an energy storage device 60. In one embodiment, energy storage device 60 includes an electrical energy storage device such as a battery capable of discharging to operate electric motor 58. In other instances, energy storage device 60 could include an electrical capacitor. In still other embodiments, an energy storage device incorporated in engine system 10 could include an energy storage flywheel or the like operated to rotate an electrical generator, a pressurized fluid supply capable of discharging pressurized fluid to rotate an electrical generator, or still another form of energy storage device.

Air system 44 may further include a throttle valve 64 positioned fluidly between electric-assist compressor 56 and intake manifold 50, and a charge air cooler 62 positioned to cool compressed air from electric-assist compressor 56, and other compressors that might be used, to intake manifold 50. It will be recalled engine system 10 may also include compressor 34, a "second" compressor arranged to feed pressurized air from air inlet 48 in air system 44 to electric-assist compressor 56. Second compressor 34 may be understood to be positioned upstream of electric-assist compressor 56 in the illustrated embodiment.

It will also be recalled air system 44 includes crankcase ventilation conduit 52. Crankcase ventilation conduit 52 may include a ventilation supply conduit. Air system 44 may further include a ventilation outlet conduit 68 extending between crankcase 18 and intake conduit 46, feeding purged fluids from crankcase 18 as further discussed herein through a ventilation outlet subsystem 66. Ventilation outlet subsystem 66 can be understood to include various cavities, crevices, etc., in or around engine housing 12 that can contain fluids desirable, at least times, to purge, as also further discussed herein.

Air system 44 may further include a compressed air recirculation conduit 70 extending between an upstream location of intake conduit 46 fluidly between electric-assist compressor 56 and air inlet 48, and a downstream location of intake conduit 46 fluidly between electric-assist compressor 56 and intake manifold 50. It should be appreciated that the term "upstream" means through intake conduit 46 in a direction of air inlet 48. The term "downstream" means through intake conduit 46 in a direction of intake manifold 50. Air system 44 may also include a second compressed air recirculation conduit 74 extending between an upstream location of intake conduit 46 fluidly between second compressor 34 and air inlet 48, and a downstream location of intake conduit 46, in the illustrated case fluidly between charge air cooler 62 and throttle valve 64. It should further be appreciated that while the term recirculation is used herein in connection with conduit 70, valve 72, conduit 74, and either or both of conduits 70 and 74, could function to bypass parts of air system 44. Put differently, the term "recirculation" is not used to imply any strict limitation to the flow direction of pressurized air through the respective conduits.

As suggested above, hydrogen fuel can be associated with various considerations respecting ignitability, flammability, and management and containment. Combustion of gaseous hydrogen fuel tends to produce a considerable amount of water vapor. When engine system 10 is operating, water vapor exhaust from combustion of gaseous hydrogen fuel can be readily exhausted to atmosphere or recirculated through air system 44 without concern. When engine system 10 is shut down, water vapor can condense into liquid water retained in cylinders 16, crankcase 18, or potentially elsewhere in engine system 10. Residual, uncombusted hydrogen can also accumulate or remain resident in certain cavities in engine system 10, including in cylinders 16, and in crankcase 18 as a result of blowby of pistons 17 during operation. It can thus be desirable prior to starting engine 11, after shutting down engine 11 and sometimes during operating engine 11 to purge gasses in the form of water vapor and/or hydrogen from undesired locations in engine system 10. Air system 44 is uniquely configured for purging of gasses and even potentially liquids from engine system 10.

To this end, air system 44 can include a first configuration for feeding pressurized air in a first flow pattern through air system 44, and a second configuration for feeding pressurized air through in a second flow pattern through air system 44. A position of at least one valve in air system 44 can be varied, such as by electronic control using ECU 40, to adjust air system 44 between the first configuration and the second configuration. In one embodiment, the first configuration includes a configuration for purging cylinders 16, and the second configuration includes a configuration for purging crankcase 18. Crankcase ventilation valve 54 can be adjusted between a closed position, causing pressurized air to flow at least predominantly through intake conduit 46 to intake manifold 50, and an open position at which pressurized air is conveyed through crankcase ventilation conduit 52 to purge crankcase 18. In the first configuration, with pressurized air from electric-assist compressor 56 purging cylinders 16 in a first flow pattern, crankcase ventilation valve 54 is closed, and each of recirculation valve 72 and recirculation valve 76 is closed. In the second configuration for purging crankcase 18, crankcase ventilation valve 54 is open and each of recirculation valve 72 and recirculation valve 76 may also be open. The different configurations and transitioning between them will be further understood by way of the following description of example methodology.

INDUSTRIAL APPLICABILITY

Figure 2:
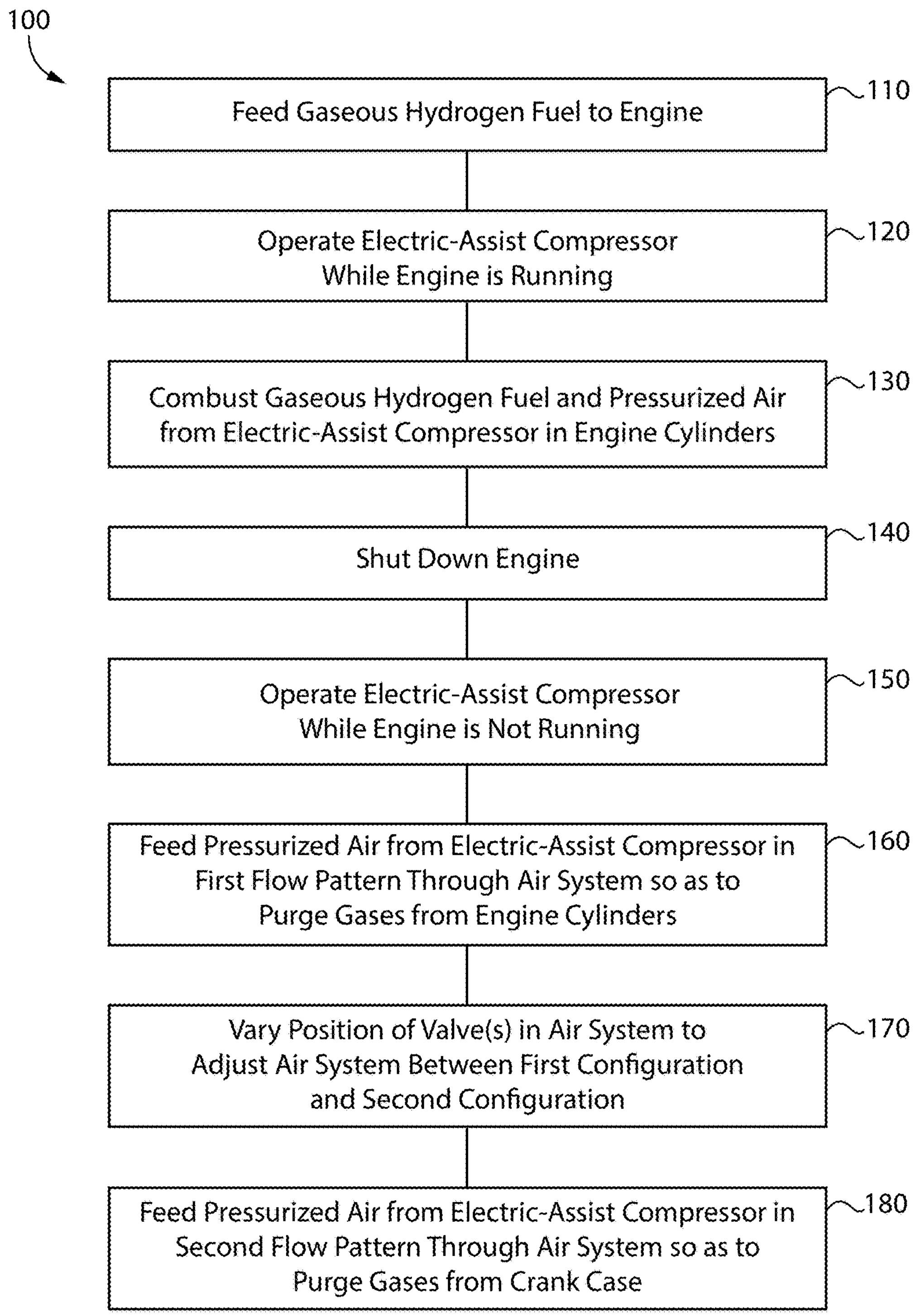
FIG. 2 is a flowchart illustrating example methodology flow, according to one embodiment.

Referring also now to FIG. 2, there is shown a flowchart 100 illustrating example methodology according to one embodiment. Operating engine system 10 can include feeding gaseous hydrogen fuel to engine 11, at a block 110. From block 110, flowchart 100 advances to a block 120 to operate electric-assist compressor 56 while engine 11 is running. Engine 11 can be understood as running when fuel is being admitted to cylinders 16, intake and exhaust valves moved to control fluid communications between cylinders 16 and intake manifold 50 and exhaust manifold 28, and sparkplugs 38 energized to trigger ignition. At a block 130, gaseous hydrogen fuel is combusted with pressurized air produced at least in part by operating electric-assist compressor 56. The pressurized air fed from electric-assist compressor 56 operated while engine 11 is running occurs according to the first flow pattern discussed above.

At a block 140, engine 11 is shut down. When engine 11 is shut down fuel is not being admitted to cylinders 16 and sparkplugs 38 are typically not being energized. From block 140, flowchart 100 advances to a block 150 to operate electric-assist compressor 56 while engine 11 is not running. Pressurized air fed from electric-assist compressor 56 operated while engine 11 is not running may occur in the same first flow pattern, so as to purge cylinders 16, as shown in block 160. During the shutdown process engine speed may be above zero to enable cylinder intake valve opening/breathing for increased purging effectiveness in some embodiments. Prior to purging cylinders 16, or after purging cylinders 16, air system 44 can be adjusted between the first configuration for feeding pressurized air in the first flow pattern and the second configuration for feeding pressurized air in the second flow pattern, as shown in block 170. Namely, crankcase ventilation valve 54 can be moved to an open position, and recirculation valves 72 and 76 each move to closed positions to now direct air from electric-assist compressor 56 through crankcase ventilation conduit 52, and then on to conduit 68. Purged gases including hydrogen that are returned to intake conduit 46 may at that point be diluted below a flammability limit. From block 170, flowchart 100 advances to a block 180 to feed pressurized air in the second flow pattern through air system 44 to purge crankcase 18.

As suggested above, the purging of cylinders 16 and the purging of crankcase 18 could occur in either order. Moreover, as also noted there can be instances where gaseous fuel buildup or potentially moisture buildup in crankcase 18 during operation occurs. In such a circumstance, crankcase ventilation valve 54 could be opened to temporarily produce a feed of pressurized air through crankcase 18 without shutting down engine 11. A transport lag between fresh air inflow to crankcase 18 and recirculation to intake conduit 46 may assist in minimizing recirculation of uncombusted hydrogen and/or water. Further still, according to a practical implementation, the purging of cylinders 16 and/or crankcase 18 according to the present disclosure might occur prior to starting engine 11, after shutting down engine 11, or both. Apart from purging functions as discussed herein, electric-assist compressor 56 may be used to provide an increased feed of pressurized air in air system 44 when desired, such as during startup or in response to transients, for example, as may be desirable in a hybrid power system such as is disclosed herein.

The present description is for illustrative purposes only, and should not be construed to narrow the breadth of the present disclosure in any way. Thus, those skilled in the art will appreciate that various modifications might be made to the presently disclosed embodiments without departing from the full and fair scope and spirit of the present disclosure. Other aspects, features and advantages will be apparent upon an examination of the attached drawings and appended claims. As used herein, the articles "a" and "an" are intended to include one or more items, and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A method of operating an engine system comprising:

operating an electric-assist compressor in an air system for an engine while the engine is running;

feeding pressurized air from the electric-assist compressor operated while the engine is running in a first flow pattern through the air system to a plurality of cylinders in the engine for combustion with a fuel therein;

operating the electric-assist compressor while the engine is not running;

feeding pressurized air from the electric-assist compressor operated while the engine is not running in the first flow pattern through the air system so as to purge the plurality of cylinders; and feeding pressurized air from the electric-assist compressor operated while the engine is not running in a second flow pattern through the air system to a crankcase of the engine so as purge the crankcase.

2. The method of claim 1 further comprising varying a position of at least one valve in the air system to adjust the air system between a first configuration for feeding pressurized air in the first flow pattern and a second configuration for feeding pressurized air in the second flow pattern.

3. The method of claim 2 wherein the varying a position of at least one valve in the air system includes adjusting a crankcase ventilation valve in a crankcase ventilation conduit to an open position to adjust the air system to the second configuration.

4. The method of claim 3 further comprising adjusting the crankcase ventilation valve to an open position while the engine is running so as to purge the crankcase while the engine is running.

5. The method of claim 2 wherein the varying a position of at least one valve includes adjusting a compressed air recirculation valve in a compressed air recirculation conduit to a closed position to adjust the air system to the second configuration.

6. The method of claim 5 wherein the compressed air recirculation conduit fluidly connects between a downstream location of an intake conduit downstream the electric-assist compressor and an upstream location of the intake conduit upstream the electric-assist compressor.

7. The method of claim 6 wherein the varying a position of at least one valve includes adjusting a second compressed air recirculation valve in a second compressed air recirculation conduit.

8. The method of claim 1 further comprising combusting a gaseous fuel in the plurality of cylinders.

9. The method of claim 8 wherein the gaseous fuel includes a gaseous hydrogen fuel.

10. The method of claim 8 wherein the air system further includes a second compressor, in a turbocharger, arranged to feed pressurized air from an air inlet in the air system to the electric-assist compressor.

11. An internal combustion engine system comprising:

an engine including an engine housing having a plurality of cylinders formed therein, a plurality of pistons positioned in the plurality of cylinders, and a crankcase coupled to the engine housing;

an air system including an intake conduit extending between an air inlet and an intake manifold coupled to the engine housing, a ventilation conduit extending between the intake conduit and the crankcase, and a crankcase ventilation valve positioned at least partially in the ventilation conduit; and an electric-assist compressor positioned fluidly between the air inlet and the intake manifold;

an electronic control unit in communication with the electric-assist compressor and with the crankcase ventilation valve;

the crankcase ventilation valve being movable from a closed position causing pressurized air from the electric-assist compressor to flow, in a first flow pattern through the air system, at least predominantly through the intake conduit to the intake manifold, to an open position where pressurized air is conveyed, in a second flow pattern through the air system, through the crankcase ventilation conduit; and the electric-assist compressor is configured to operate when the engine is not running, and the electronic control unit being configured to adjust the crankcase ventilation valve, when the engine is not running, between the closed position for purging the plurality of cylinders, and the open position for purging the crankcase.

12. The engine system of claim 11 wherein the air system further includes a compressed air recirculation conduit extending between an upstream location of the intake conduit fluidly between the electric-assist compressor and the air inlet, and a downstream location of the intake conduit fluidly between the electric-assist compressor and the intake manifold.

13. The engine system of claim 12 wherein the air system further includes a second compressor positioned upstream of the electric-assist compressor.

14. The engine system of claim 13 wherein the air system further includes a second compressed air recirculation conduit extending between an upstream location of the intake conduit fluidly between the second compressor and the air inlet, and a downstream location of the intake conduit.

15. The engine system of claim 13 wherein the electric-assist compressor is coupled to an electric motor, and the second compressor includes a compressor in a turbocharger.

16. The engine system of claim 11 wherein the air system further includes a charge air cooler positioned to cool compressed air fed from the electric-assist compressor to the intake manifold.

17. The engine system of claim 1 wherein the crankcase ventilation conduit includes a ventilation supply conduit, and the air system further includes a ventilation outlet conduit extending between the crankcase and the intake conduit.

18. An energized air system for an engine comprising;

an intake conduit having an air inlet, and configured to extend to an intake manifold coupled to an engine;

a compressed air recirculation conduit arranged to recirculate compressed air between an upstream location of the intake conduit and a downstream location of the intake conduit;

an electric-assist compressor arranged fluidly between the upstream location of the intake conduit and the downstream location of the intake conduit and arranged to feed pressurized air to the intake manifold;

a second compressor arranged to feed compressed air to the electric-assist compressor;

a crankcase ventilation conduit; and a crankcase ventilation valve positioned at least partially in the crankcase ventilation conduit, and adjustable between a closed position and an open position;

an electronic control unit in communication with the electric-assist compressor and with the crankcase ventilation valve;

the crankcase ventilation valve being movable from a closed position causing pressurized air from the electric-assist compressor to flow, in a first flow pattern through the air system, at least predominantly through the intake conduit to the intake manifold, to an open position where pressurized air is conveyed, in a second flow pattern through the air system, through the crankcase ventilation conduit; and the electric-assist compressor is configured to operate when the engine is not running, and the electronic control unit being configured to adjust the crankcase ventilation valve, when the engine is not running, between the closed position for purging the plurality of cylinders, and the open position for purging the crankcase.

19. The air system of claim 18 wherein the upstream location of the intake conduit is fluidly between the electric-assist compressor and the second compressor, and further comprising a compressed air recirculation valve positioned at least partially in the compressed air recirculation conduit and adjustable between a closed position and an open position.

20. The air system of claim 19 wherein the crankcase ventilation conduit includes a ventilation supply conduit, and the air system further includes a ventilation outlet conduit extending between the crankcase and the intake conduit.

* * * * *